United States Patent
Wiklof et al.

[11] Patent Number: 5,912,452
[45] Date of Patent: Jun. 15, 1999

[54] METHOD AND APPARATUS FOR READING ONE-AND TWO-DIMENSIONAL SYMBOLS WITH A LINEAR DETECTOR

[75] Inventors: Christopher A. Wiklof, Everett; H. Sprague Ackley, Seattle, both of Wash.

[73] Assignee: Intermec Corporation, Everett, Wash.

[21] Appl. No.: 08/795,590

[22] Filed: Feb. 6, 1997

[51] Int. Cl.[6] ........................................... G06K 7/10
[52] U.S. Cl. .......................... 235/472.01; 235/462.11
[58] Field of Search ............... 235/472.01, 462.1, 235/454, 463, 470, 440, 456, 462.11, 462.32

[56] References Cited

U.S. PATENT DOCUMENTS

| | | | |
|---|---|---|---|
| 4,146,046 | 3/1979 | Dobras | 235/463 |
| 4,743,744 | 5/1988 | Nakase et al. | 235/472 |
| 5,115,120 | 5/1992 | Eastman | 235/462 |
| 5,124,537 | 6/1992 | Chandler et al. | 235/470 |
| 5,304,787 | 4/1994 | Wang | 235/462 |
| 5,319,181 | 6/1994 | Shellhammer et al. | 235/470 |
| 5,396,054 | 3/1995 | Krichever et al. | 235/462 |
| 5,414,250 | 5/1995 | Swartz et al. | 235/462 |
| 5,414,251 | 5/1995 | Durbin | 235/462 |
| 5,442,164 | 8/1995 | Adachi | 235/462 |
| 5,539,919 | 7/1996 | Ackley | 235/462 |
| 5,572,007 | 11/1996 | Aragon et al. | 235/462 |
| 5,576,851 | 11/1996 | Aoki | 235/462 |
| 5,600,121 | 2/1997 | Kahn et al. | 235/472 |
| 5,621,203 | 4/1997 | Swartz et al. | 235/462 |
| 5,627,358 | 5/1997 | Roustaei | 235/462 |
| 5,631,457 | 5/1997 | Fukuda et al. | 235/472 |
| 5,635,697 | 6/1997 | Shellhammer et al. | 235/462 |
| 5,756,981 | 5/1998 | Roustaei et al. | 235/462 |

*Primary Examiner*—Donald Hajec
*Assistant Examiner*—Diane I. Lee
*Attorney, Agent, or Firm*—Seed and Berry LLP

[57] ABSTRACT

A symbology reader uses a linear detector to image a two-dimensional area by scanning the field of view of the linear detector across an image field. In one embodiment, the reader simultaneously decodes data from the linear detector according to two-dimensional techniques and linear and stacked symbology techniques. If the reader identifies a linear or stacked symbology, the two-dimensional processing is interrupted. As the reader scans the field of view of the linear detector across the image field, the scanning mirror simultaneously sweeps a light plane across the image field so that only the imaged region is illuminated, thereby improving the dynamic range of the reader.

4 Claims, 4 Drawing Sheets

METHOD AND APPARATUS FOR READING ONE-AND TWO-DIMENSIONAL SYMBOLS WITH A LINEAR DETECTOR

TECHNICAL FIELD

The present invention relates to automatically reading information and, more particularly, to imaging a two-dimensional area with a linear detector.

BACKGROUND OF THE INVENTION

Bar code symbologies ("bar codes") are widely used for data collection. The first bar code symbologies developed, such as U.P.C., EAN, Code 39, Codabar, Interleaved 2 of 5, and Code 93 can be referred to as "linear symbologies" because data in a given symbol is decoded along one axis or direction. Linear symbologies generally encode data characters as parallel arrangements of alternating, multiple-width strips of lower reflectivity or "bars" separated by absences of such strips having higher reflectivity or "spaces." Each unique pattern of bars and spaces within a predetermined width defines a particular data character. A given linear symbol encodes several data characters along its length as several groups of unique bar and space patterns.

Newer data collection symbologies have departed from the typical linear symbologies to create stacked or area symbologies in order to increase "information density," i.e., the amount of information encoded within a given area. "Stacked symbologies" or "multi-row symbologies" employ several adjacent rows of multiple-width bars and spaces (e.g., Code 49, PDF417, etc.). "Area symbologies" or two-dimensional matrix symbologies employ arrangements of regular polygonal data cells where the center-to-center distance of adjacent cells is uniform (e.g., MaxiCode, Code One, Data Matrix, Aztec Code, etc.).

Currently available scanning readers read linear symbologies typically by illuminating a small region of a target object with a narrow collimated beam and scanning the beam back and forth across the target object. Light from the scanned beam is reflected back to a light sensor within the reader that produces a profile based upon the light reflected from the linear symbol. The profile is generally an analog signal representing the modulated light reflected from the spaces and absorbed by the bars in the linear symbol and thereby represents the pattern of bars and spaces in a given linear symbol. The analog profile is then converted to a digital signal that is processed to identify the characters within the linear symbol. The sensor may be a simple "point-type" photodetector or may be a linear charged coupled device ("CCD"). Such devices can operate very quickly and have substantial depth of field.

Reading stacked symbologies with scanning beam-type detectors typically involves a raster scanning approach where the beam is scanned horizontally across the target object at a series of subsequent vertical locations. For each sweep, the sensor output is converted to a digital signal. The digital signal is then mapped into a two-dimensional character array and processed to decode the symbol or symbols. The optics for raster scanning a collimated beam can be complex and relatively costly. Moreover, such raster scanning can be time consuming, and, during the time the raster scanning is ongoing, a user may shift the reader. The reader will then have an incorrect indication of the relative locations of light and dark regions, thereby impairing decoding.

To overcome such problems, two-dimensional readers have been proposed that employ two-dimensional semiconductor arrays, Vidicons, or other suitable light-receiving elements that image an entire two-dimensional area substantially simultaneously. Due to optical limitations inherent in such imaging devices, these readers have a relatively small depth-of-field within which symbols can be read. To increase the reader's depth-of-field, some two-dimensional dimensional readers employ autofocus systems. Autofocus systems can be costly and relatively slow. Moreover, even readers with autofocus systems are limited by the depth-of-field of the autofocus system. Additionally, even when reading linear or stacked symbologies, such systems employ relatively complex area-type processing for finding, identifying and decoding. The complexity of such processing makes these readers undesirably slow for many linear and stacked symbology applications.

SUMMARY OF THE INVENTION

A symbology reader utilizes a linear detector having a substantially linear field of view that is swept across an image field to detect reflectivity variations across the image field. In one embodiment of the invention, the linear detector is a linear CCD array. The reader preferably includes an aiming structure aligned to the linear detector and configured to translate the field of view to an object field outside of the reader housing. The aiming structure in one embodiment includes a scanning or dithering mirror that shifts the field of view to a series of positions under control of a microprocessor-based controller. An analog-to-digital converter coupled to the linear detector provides a digital signal that is input both to the microprocessor directly and to a memory array within the controller.

The controller is programmed to decode data from the memory array according to two-dimensional symbology techniques. Additionally, the microprocessor processes the data received directly from the A/D converter according to linear or stacked symbology techniques. When the microprocessor identifies a linear or stacked symbology, the controller terminates the two-dimensional decoding operation and decodes according to linear and stacked symbology techniques, thereby using controller resources efficiently.

In one embodiment, the reader includes an illuminator that illuminates the field of view to increase the resolution of the reader. The illuminator may include a collimated beam source that directs the beam through a beam spreader to provide a light plane to illuminate the linear field of view of the linear detector. Alternatively, the illuminator may be an array of light sources or a backlit slit. Alternatively, the illuminator may be eliminated where the sensitivity of the linear detector is sufficient to operate with only ambient light.

In one embodiment, the reader includes a secondary linear detector aligned to a window in a reader housing. The secondary linear detector detects a peripheral region of the light plane and provides an electrical signal to the microprocessor of the elevation of the light plane. Alternatively, the microprocessor can use time-based interpolation based upon the scanning rate of the scanning mirror to calculate the instantaneous elevation of the sheet of light. Alternatively, where the scanning mirror is scanned by a digitally controlled motor, the controller can calculate the position by monitoring a clock signal of the motor. As another alternative, the reader can use information encoded in the symbol to identify the type of symbology and/or the location of the scanned region within the symbol.

DETAILED DESCRIPTION OF THE INVENTION

A scanning system, and in particular, an apparatus and method for imaging and decoding data collection symbols, other machine-readable images, or graphics is described in detail herein. In the following description, numerous specific details are set forth such as specific linear or stacked symbols, methods of scanning imaging elements in such symbols, etc., in order to provide a thorough understanding of the present invention. One skilled in the relevant art, however, will readily recognize that the present invention can be practiced without the specific details, or with other symbols, control signals, etc. In other instances, well-known structures are not shown in detail in order to avoid obscuring the present invention.

Figure 1:
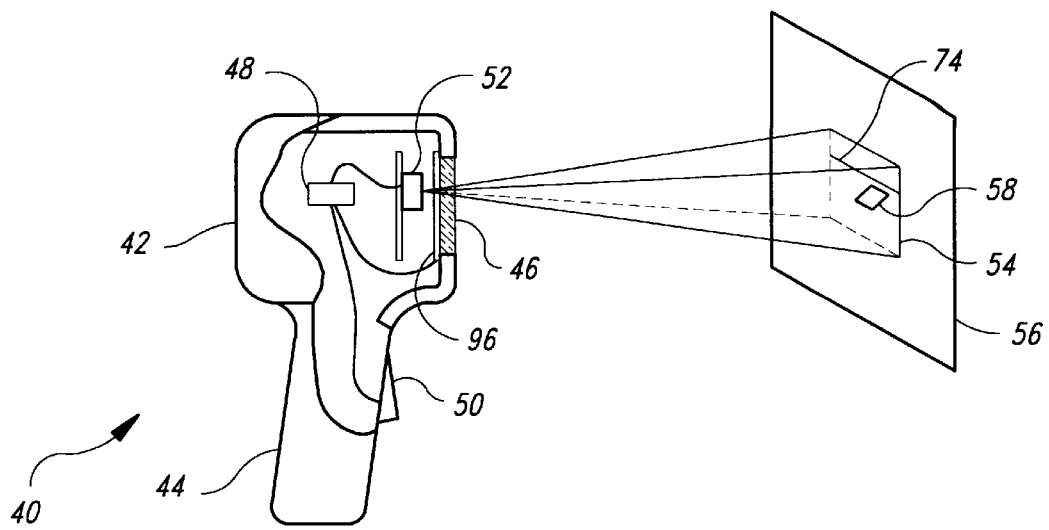
FIG. 1 is a side-elevational view of a symbology reader according to a preferred embodiment of the invention with a portion of the housing cut away to reveal a scanning and imaging assembly and control electronics.

As shown in FIG. 1, a preferred embodiment of the invention is embodied in a symbology reader 40 having a head 42 and a handle 44, wherein a window 46 provides a passageway for light to enter and exit the head 42. A microprocessor-based controller 48 in the head 42 controls operation of the reader 40 in response to activation of a trigger 50 in the handle 44.

Figure 2:
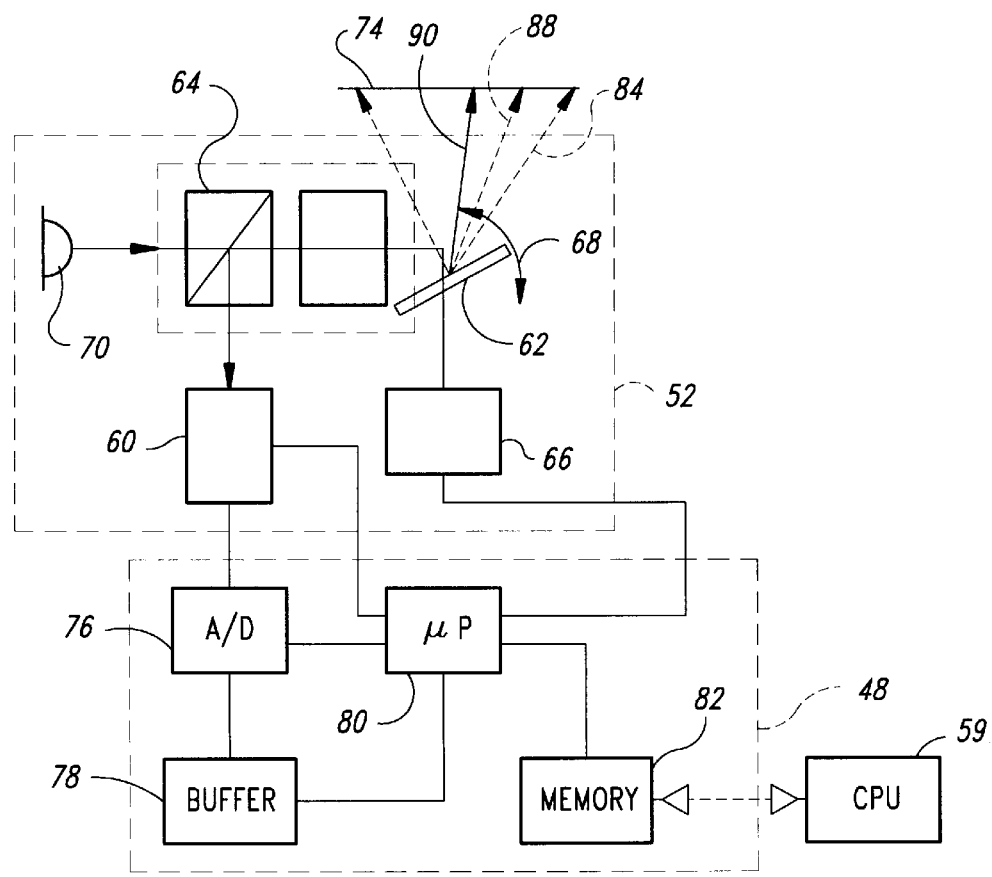
FIG. 2 is a block diagram of the scanning and imaging assembly of the reader of FIG. 1 showing scanning of a beam with a rotatable mirror.

When a user activates the reader 40 by pressing the trigger 50, the controller 48 activates an imaging assembly 52, shown in greater detail in FIG. 2, to image a two-dimensional image field 54 on a target object 56. As will be described in greater detail below, the imaging assembly 52 produces an electrical signal corresponding to reflectivity variations in the image field 54. The controller 48 processes the electrical signal to identify and decode a symbol 58 in the image field 54. The reader 40 stores the decoded data in a memory 82 as described below for later downloading to a central processor 59. As represented diagrammatically in FIG. 2, data is downloaded through an infrared (IR) link; however, any suitable downloading approach may be used. Alternatively, in some applications, downloading may not be necessary. Additionally, the central processor 59 may be a base station, personal computer or any other suitable peripheral device.

Figure 3:
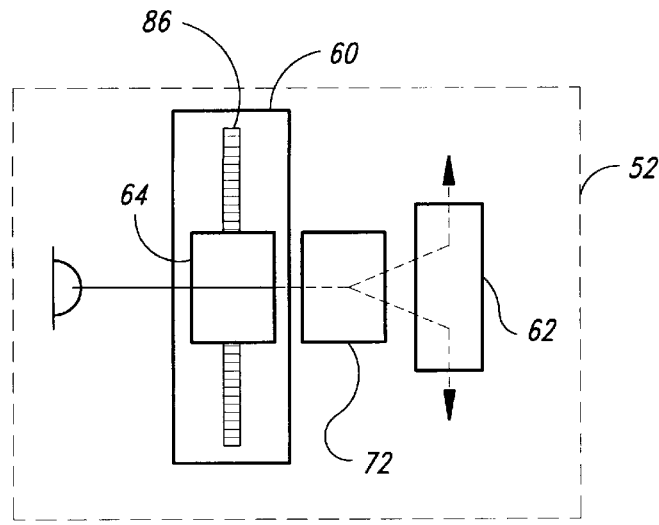
FIG. 3 is a block diagram of the scanning and imaging assembly of FIG. 2 rotated 90 degrees, showing spreading of the illuminating beam.

Unlike conventional two-dimensional imagers, the imaging assembly 52 does not rely upon a two-dimensional CCD array or a raster scanned single-point illuminator. Instead, as can be seen in FIGS. 2 and 3, the imaging assembly 52 uses a linear detector 60 with a substantially linear field of view and scans the linear field of view across the image field 54. The linear detector 60 is a conventional, commercially available linear CCD array, such as a Sony ILX503A having 2048 elements 86.

A scanning mirror 62 and a beam splitter 64 reflect light from the image field 54 to the linear detector 60 to translate the field of view of the linear detector 60 to the image field 54. To allow the linear detector 60 to image the entire two-dimensional image field 54, an electric motor 66 sweeps the scanning mirror 62 through a selected angular range, as indicated by the arrows 68 in FIG. 2. The motor 66 is a conventional scanning or "dithering" motor that operates under control of the controller 48. The mirror 62 may be any suitable scanning structure, such as a planar or polygonal mirror.

One way in which the imaging assembly 52 differs from conventional raster scanned imaging systems is that the imaging assembly 52 illuminates the image field 54 with a moving "light plane." That is, light emitted from the reader 40 has a substantially linear cross section as wide, or wider than the image field 54. Because the beam is spread into a light plane, the beam forms a continuous line 74 on the target object 56 (FIG. 1). To produce the light plane, collimated light from an LED 70 or similar light emitter is spread laterally by a beam spreader 72 positioned between the beam splitter 64 and the mirror 62. The beam spreader 72 converts the collimated beam of light to a diverging beam of light having a substantially linear cross section. The light strikes the mirror 62 where it is redirected toward the image field 54. As the mirror 62 rotates, the line 74 moves vertically and is thus swept through the image field 54 by the mirror 62. Unlike a raster scanned image, the light plane of the preferred embodiment is scanned along only a single axis.

As can be seen in FIG. 2, the field of view of the linear detector 60 is coplanar with the light beam from the LED 70 between the beam splitter 64 and the mirror 62. Thie field of view thus follows the light plane between the mirror 62 and the target object 56. Therefore, the mirror 62 and the beam splitter 64 direct reflected light from the target object 56 to the linear detector 60. The linear detector 60 quickly images an entire linear region of the image field 54, so that, unlike a raster-scanned system, the field of view of the linear detector 60 does not need to be physically scanned along the horizontal axis.

The output of the linear detector 60 is converted from an analog signal to a digital signal at an analog-to-digital (A/D) converter 76 within the controller 48. The resulting digital signal is then input to a buffer 78 that temporarily stores the digital signal for decoding by a microprocessor 80. As will be described below, the microprocessor 80 locates, identifies, and decodes the symbol 58 and stores a digital representation of the symbol 58 in the memory 82. The embodiment described herein employs the A/D converter 76 to convert the variable voltage analog signal from the linear detector 60 to a digital signal for input to the microprocessor 80, to allow gray level detection. For example, each element of the symbol 58 may have one of 16 gray levels where each gray level represents a 4-bit word. For less sophisticated applications (i.e., applications that do not utilize gray levels), the A/D converter 76 may be replaced with a simple threshold detector.

Figure 4:
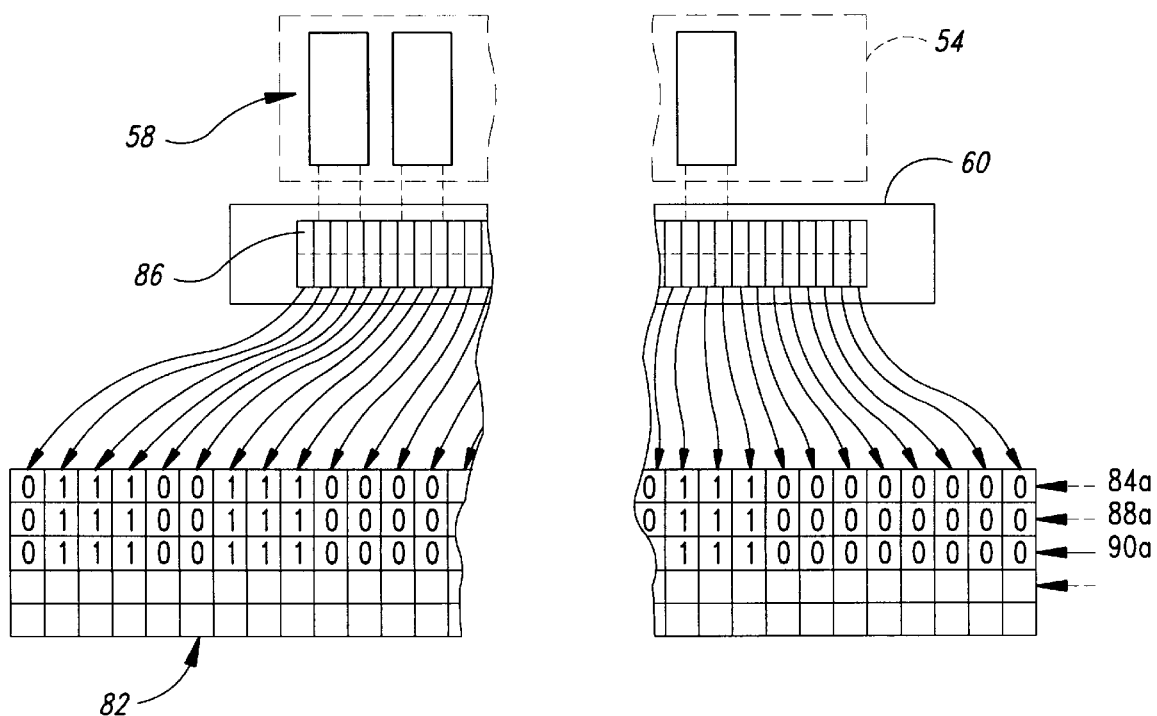
FIG. 4 is a diagrammatic representation of mapping of detected light by the linear detector from the linear detector into a memory array.

FIG. 4 shows diagrammatically how dark and light areas of the image field 54 map to elements of the linear detector 60. FIG. 4 further shows how the data from the A/D converter 76 is converted to a digital representation of the reflectivity of the image field 54 and is stored in the memory 82. When the mirror 62 is near its angular extreme, as represented by the arrow 84 in FIG. 2, the linear detector 60 receives light from a first horizontal "slice" of the image field 54. Each element 86 of the linear detector 60 detects reflected light from the slice. As indicated in FIG. 4 by arrow 84*a*, the output of each element 86 is converted to a "1" or a "0" and is stored in a corresponding location in a first row 84*a* of the buffer 78. As the mirror 62 pivots, the light plane and the optic axis of the linear detector's field of view move across the image field 54, as indicated by the arrows 88, 90 in FIG. 2. The linear detector 60 detects the reflected light at each subsequent location and the controller 48 produces a "1" or a "0" based upon the corresponding output from the A/D converter 76. The "1" or "0" representing the light detected by each of the elements 86 at each of the locations maps into a respective row 88*a*, 90*a* of the memory 82 (FIG. 4). When the sweep is completed, the memory 82 contains a complete digital mapping of the reflectivity of the image field 54 where each "1" represents an area of low reflectivity (a "bar") and each "0" represents an area of high reflectivity (a "space"). The microprocessor 80 can then process the data map to locate, identify, and decode the symbol 58, according to conventional two-dimensional image processing techniques.

Figure 5:
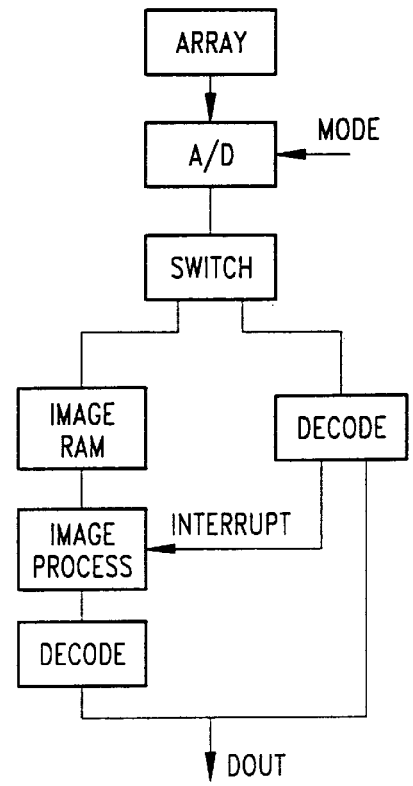
FIG. 5 is a block diagram of decode logic showing parallel decoding according to linear and two-dimensional symbol techniques.

The microprocessor 80 is not necessarily limited to two-dimensional processing techniques, because the A/D converter 76 provides data directly to the microprocessor 80 in addition to transferring data to the memory 82. As shown in FIG. 5, the microprocessor 80 processes this directly-provided data according to conventional linear and stacked symbology processing techniques in an attempt to locate and decode a linear or stacked symbology. Because such techniques typically employ simpler, faster algorithms than those of two-dimensional techniques, the microprocessor 80 can perform such processing substantially in "real-time." Consequently, if the symbol 58 is a linear or stacked symbol, the microprocessor 80 will complete the linear or stacked symbology decode before finishing the two-dimensional decode.

To prevent unnecessary expenditure of microprocessor resources, the microprocessor 80 generates an interrupt command as soon as it identifies a linear or stacked symbol. The interrupt terminates mapping of data into the memory 82 and the processing of data according to two-dimensional techniques. Thus, if the symbol 58 is a linear or stacked symbol, the microprocessor 80 decodes the linear or stacked symbology according to only linear or stacked symbology techniques. If the symbol 58 is not a linear or stacked symbol, mapping of the image field 54 into the memory 82 continues uninterrupted and the microprocessor 80 processes the symbol using two-dimensional techniques.

If the symbol 58 is a linear, bar code or stacked symbol, the reader 40 may be able to decode the symbol without identifying the relative vertical positions of each horizontal "slice," assuming the reader 40 is aimed at the symbol 58 and the field of view of the linear detector 60 aligned with the symbol 8. An example of such alignment is shown by the arrows 93 in FIG. 6, where the field of view intersects an adequate number of bars or analogous regions of the symbol 58 to allow the reader 40 to read and decode the symbol 58.

Figure 6:
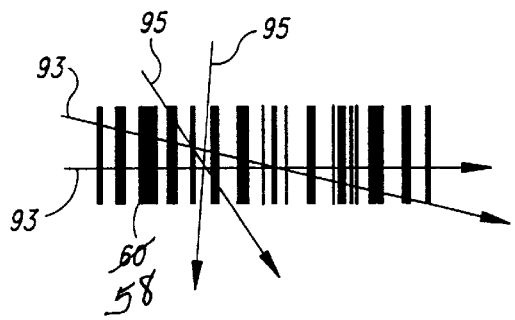
FIG. 6 is a diagram of angular alignment of the field of view of the linear detector relative to a symbol.

If the reader 40 is aligned with its field of view skewed relative to the symbol 58 as indicated by the arrows 95 in FIG. 6, or if the symbology is a two-dimensional symbology, the reader 40 uses the relative positions of each slice for constructing a map of the image field 54 and decoding. Consequently, the reader 40 tracks or otherwise identifies the relative position of each slice for each set of data.

The approach to tracking the relative position for each set of data depends upon the expected application of the reader 40. In one embodiment, the controller 48 identifies the relative position of each of the slices by monitoring the position at which the light plane exits the reader 40 with a secondary linear detector 96 (FIG. 1). The secondary linear detector 96 is mounted vertically, adjacent to the window 46, such that an edge portion of the light plane overlaps the secondary detector 96. Because the light plane has a narrow cross section, the light plane illuminates only one, or a very few, of the elements of the secondary detector 96. The controller 48 receives the output of the secondary detector 96 and can therefore determine the vertical position of the light plane by identifying which elements of the secondary detector 96 receive light. The vertical position of the light plane is then used by the microprocessor 80 to order the data from the slices, as described above.

While the preferred embodiment employs the secondary detector 96 to identify the vertical position of the light plane, a variety of other techniques for determining the vertical position may be within the scope of the invention. For example, under a first alternative embodiment, where the motor 66 scans in response to a clock signal, the controller 48 can monitor clock pulses to determine the position of the mirror 62. Then, based upon the mirror position, the microprocessor 80 can easily calculate the vertical position of the light plane.

Similarly, where the mirror 62 rotates or dithers in a periodic pattern, the controller 48 can determine the vertical position through a time-based interpolation. That is, the controller 48 determines the endpoints of each scan (e.g., by detecting peaks in the motor current or by monitoring quadrature signals at the mirror motor) and interpolates between the endpoints based upon the overall period of the mirror 62 and the elapsed portion of the period. For example, if the period is 8 ms, and 4 ms have elapsed since the last peak, the light plane is in the center of the sweep. Further, while the secondary detector 96 is presented in FIG. 1 as being mounted adjacent the window 46, the secondary detector 96 may be mounted elsewhere. For example, an edge region of the window 46 may reflect an end portion of the light plane back into the reader, allowing the secondary detector 96 to be mounted facing the window in a more central area of the head 42.

In a second alternative embodiment, the microprocessor 80 may determine the position of a scan based upon information encoded in the symbol 58 itself. For example, in some stacked symbologies, such as PDF417, each row contains a field indicating the row number, and each row is encoded under one of three parity sets. The controller 48 can thus order the decoded rows based upon the information in the field or the parity of the symbols in a row instead of by determining the position of the light plane. To increase the speed at which data is stored, the microprocessor 80, for example, can initially process only the field containing the row number. Based upon the processed field, the controller 48 then arranges data in the memory 82 according to the row number. Once the data is stored in the appropriate order, the microprocessor 80 processes the symbol to identify the information represented by the symbol.

Figure 7:
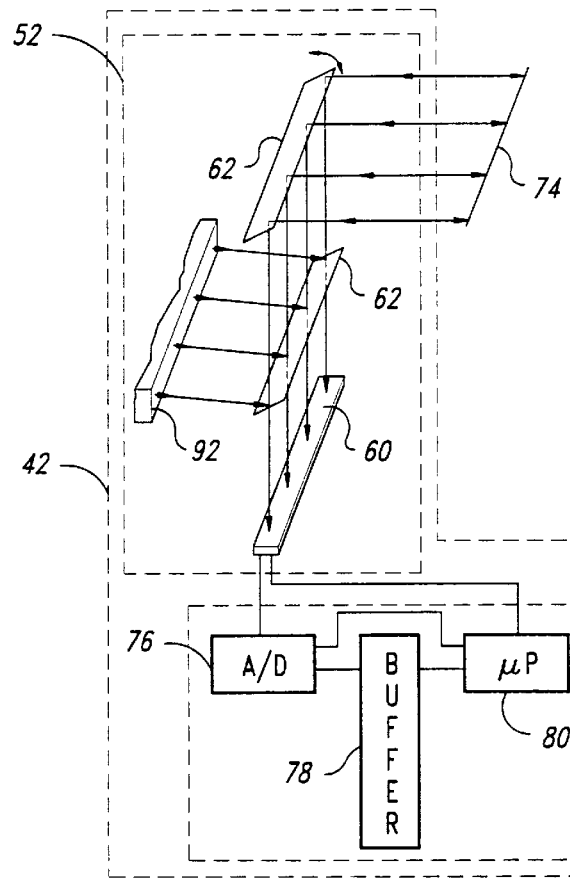
FIG. 7 is a diagrammatic representation of an alternative embodiment of the invention with a linear illuminator.

FIG. 7 shows another alternative embodiment of the invention where the LED 70 and beam spreader 72 are replaced by a linear illuminator 92. The linear illuminator 92 may be a bank of LEDs, a backlit slit, or any other suitable structure for producing a light plane. As with the embodiment of FIGS. 1–3, the light plane is swept through an angular range by the scanning mirror 62. Because the linear illuminator 92 provides a uniform light plane, the beam spreader 72 is illuminated and the optics of the imaging assembly 52 are thereby simplified.

To more quickly locate the symbol 58, the reader 40 can vary scan density. In this approach, the imaging assembly 52 initially operates in a sparse-scan mode. That is, the linear detector 60 does not image immediately adjacent slices of the image field 54. Instead, the linear detector 60 images only a selected few locations. For example, the linear detector 60 may image the image field 54 at five or ten degree increments through the angular range. The microprocessor 80 then implements an abbreviated finder technique to identify probable regions containing the symbol 58. Then, the linear detector 60 images at much finer angular increments in the regions in which the symbol 58 is predicted to be.

To select the finer increments, the controller 48 can vary the angular range through which the mirror 62 scans, or the rate at which the scan mirror scans by controlling the scanning motor. Alternatively, the controller 48 can leave the scan rate and angular range constant and select the scan increments by controlling the rate and/or times at which data is clocked out of the linear detector 60 or the A/D converter 76. For example, by clocking data out of the linear detector 60 at time increments corresponding to 5 degree rotation of the mirror 62, the controller 48 can process data from slices of the image field 54 that are 5 degrees apart.

Figure 8:
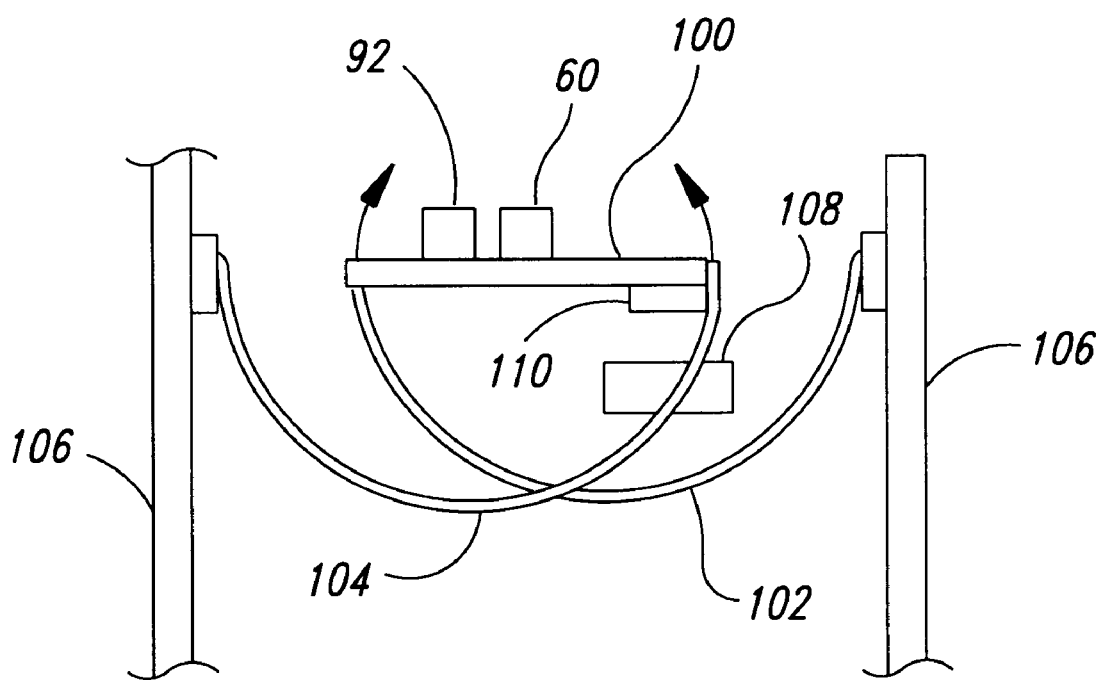
FIG. 8 is a side elevational view in cross section of a portion of another embodiment of the symbology reader where the illuminator and linear detector are flexurally mounted.

FIG. 8 shows another embodiment in which the scanning mirror 62 is removed. To scan the image field 54, the linear detector 60 and illuminator 92 are scanned physically.

In this embodiment, the linear detector 60 and illuminator 92 are mounted to a base 100 that is carried by flexures 102, 104. The base 100 is a conventional mounting board, such as a commercially available flex board. The flexures 102, 104 are resilient metal bands having one end connected to the reader's body 106 and the opposite ends connected to the base 100. Flexural mounting of flexbands carrying components is known, being described for example in U.S. Pat. No. 5,115,120 to Eastman which is incorporated herein by reference.

To scan the linear detector 60, a magnetic field from a coil 108 drives a permanent magnet 110 mounted to the base 100. The angle of rotation of the base 100 will be determined by the strength of the magnetic field, the distance between the coil 108 and the permanent magnet 110. The microprocessor 80 (FIG. 6) can thus control angular sweeping of the base 100 and thus the illuminator 92 and the linear detector 60, by controlling current flow to the coil 108.

As in the embodiments described previously, for each location in the image field 54, the linear detector 60 produces a set of output data representing the reflectivity of the "slice" of the image field 54. Identification and decoding then can be performed according to any of the above-described techniques.

Although the invention has been described herein by way of exemplary embodiments, various modifications may be made without departing from the spirit and scope of the invention. The teachings provided herein of the present invention can be applied to other imaging systems, not necessarily the exemplary symbology reader described above. For example, where the linear detector 60 is sufficiently sensitive, the reader 40 may be implemented without the LED 70 or linear illuminator 92 for some applications. While this embodiment is not preferred because of its reduced dynamic range relative to the illuminated embodiments of FIGS. 1–4, 7, and 8, the elimination of the LED 70 and illuminator 92 advantageously reduces the power consumption and complexity of the reader 40. Similarly, where the reader 40 is intended for reading only linear or stacked symbologies, the image buffer 78 may be eliminated. In such an embodiment, the symbol 58 is located, identified and decoded according to linear and stacked symbology techniques. Similarly, where sufficient processing capability is available or where the symbol 58 is expected to be consistently a two-dimensional symbol, the reader 40 may locate, identify, and decode the symbol 58 according to two-dimensional techniques only without generating an interrupt. Also, where the linear detector 60 is physically scanned, such as in the embodiments of FIG. 8, a variety of other physical scanning approaches may be employed. For example, the linear detector 60 and illuminator 92 may be mounted to a platform carried by a dithering motor. Then, the motor can be stopped or continuously swept back and forth so that the field of view of the illuminator 92 sweeps across the image field 54. These and other changes can be made to the invention in light of the above detailed description. In general, in the following claims, the terms used should not be construed to limit the invention to the specific embodiments disclosed in the specification and the claims, but should be construed to include all readers that operate in accordance with the claims to provide a method for imaging two-dimensional fields. Accordingly, the invention is not limited except as by the appended claims.

We claim:

1. A method of imaging a two-dimensional image field, comprising:

illuminating the two-dimensional image field with light, the light being substantially fixed relative to the two-dimensional image field during the imaging;

providing a linear detector having a field of view along an optic axis;

aligning the field of view to an initial linear region of the image field;

substantially simultaneously imaging the initial linear region to produce a first image portion while the field of view is substantially in a single position;

pivoting the optic axis a selected increment to align the field of view to a subsequent linear region of the image field;

substantially simultaneously imaging the subsequent linear region to produce a subsequent image portion;

repeatedly pivoting the optic axis a selected increment to align the field of view to a subsequent region and imaging the subsequent region to produce a subsequent image portion until the optic axis has pivoted through a selected angular range; and before completing the repeated pivoting and imaging, performing a decode operation according to linear or stacked symbology decoding techniques; and if the decode operation does not identify a linear or stacked symbology, performing a decode operation according to two-dimensional symbology techniques.

2. A method of imaging a two-dimensional image field, comprising:

illuminating the two-dimensional image field with light, the light being substantially fixed relative to the two-dimensional image field during the imaging;

providing a linear detector having a field of view along an optic axis;

aligning the field of view to an initial linear region of the image field;

substantially simultaneously imaging the initial linear region to produce a first image portion while the field of view is substantially in a single position;

pivoting the optic axis a selected increment to align the field of view to a subsequent linear region of the image field;

substantially simultaneously imaging the subsequent linear region to produce a subsequent image portion;

repeatedly pivoting the optic axis a selected increment to align the field of view to a subsequent region and imaging the subsequent region to produce a subsequent image portion until the optic axis has pivoted through a selected angular range; and before completing the repeated pivoting and imaging, performing a decode operation according to linear or stacked symbology decoding techniques by beginning the decode operation according to two-dimensional symbology techniques; and if the linear decode operation identifies a linear or stacked symbology, interrupting the two-dimensional symbology decode operation.

3. A symbology reading system comprising:

a light emitter having a beam pattern along an optic axis with a substantially linear cross-section;

a first linear array having a substantially linear field of view, the first linear array being operational to produce electrical signals indicative of light energy in respective regions of the field of view;

an optical assembly aligned to the field of view and the optic axis and including an electronically controlled beam steering assembly, the beam steering assembly being alignable to simultaneously sweep the beam pattern and translate the field of view through a plurality of positions;

a memory array including a plurality of memory locations;

an electronic controller coupled to the linear array and the memory array to store in the memory array data representative of the electrical signals indicative of the light energy in the respective regions of the field of view; and a second linear array positioned to detect a portion of the beam pattern to provide an indication of elevation of the beam pattern.

4. The symbology reading system of claim 3 wherein the second linear array is mounted transversely to the optic axis and a line defined by the linear cross-section.

* * * * *